United States Patent [19]

Way

[11] 3,801,968

[45] Apr. 2, 1974

[54] WRITE-READ CHECKER

[75] Inventor: John L. Way, La Canada, Calif.

[73] Assignee: Bell & Howell Company, Chicago, Ill.

[22] Filed: Jan. 10, 1972

[21] Appl. No.: 216,677

[52] U.S. Cl. .............................. 360/40, 360/53

[51] Int. Cl. .............................. G11b 5/46

[58] Field of Search...340/174.1 B, 174.1 G, 174.1 H

[56] References Cited

UNITED STATES PATENTS

| | | | |
|---|---|---|---|
| 3,359,548 | 12/1967 | Yoshii et al. | 340/174.1 B |
| 3,510,857 | 5/1970 | Kennedy et al. | 340/174.1 B |
| 3,653,011 | 3/1972 | Donohue et al. | 340/174.1 B |

*Primary Examiner*—Vincent P. Canney
*Attorney, Agent, or Firm*—Benoit Law Corporation

[57] ABSTRACT

A method of operating information recording and playback apparatus having recording equipment including an encoder for encoding input information from a first form into a second form preparatory to recording, and playback equipment including a decoder for decoding information from the second form to the first form upon information playback. According to this method, the information is encoded from the first form to the second form with the encoder in the recording equipment and is recorded in the second form. During information recording, information is decoded from the second form to the first form with the decoder in the playback equipment and a discrepancy between the information decoded from the second form to the first form and the input information in the first form is detected and acted upon.

Apparatus for practicing this method are also disclosed.

11 Claims, 36 Drawing Figures

WRITE-READ CHECKER

BACKGROUND OF THE INVENTION

1. Field of the Invention

The subject invention relates to information recording and playback apparatus and, more particularly, to methods of operating information recording and playback apparatus having equipment for converting information from a first form into a second form prior to recording and from the second form into the first form upon information playback. By way of example, the first and second forms may be different codes in which the information is coded.

2. Description of the Prior Art

Recording methods and apparatus which convert information from a first form into a second form preparatory to recording are well known in various areas of the recording art. For instance, information is often modulated prior to recording and is thus converted from an unmodulated form to a modulated form. Frequent examples in this area include the time modulation of signals by video or instrumentation tape recorders.

In a similar vein, input information is frequently coded prior to recording and is thus converted from an analog form to a coded form. On the other hand, signals which may be in a first code are often converted to a second code prior to recording. This is, for instance, done when the first code is not as suitable for recording purposes as the second code.

In all these instances, defects in the equipment which converts the information from the first form or code to the second form or code will produce recording errors which may have serious consequences upon the playback and utilization of the recorded information. In some areas of information or data processing, additional equipment is employed for continuously checking and supervising the performance of the system. Such additional equipment is expensive and introduces further complexities into the system.

SUMMARY OF THE INVENTION

It is an object of the subject invention to provide methods of operating information recording and playback apparatus which use information converting means of the playback equipment in order to check on the performance of the information recording means of the recording equipment during the recording process.

From one aspect thereof, the subject invention resides in a method of operation information recording and playback apparatus having recording equipment including an encoder for encoding input information from a first form into a second form preparatory to recording, and playback equipment including a decoder for decoding information from the second form to the first form upon information playback. The invention according to this aspect more specifically resides in the improvement comprising in combination the steps of encoding the information from the first form to the second form with the encoder, recording the encoded information in the second form, decoding the information from the second form to the first form with the decoder in the playback equipment during information recording, detecting a discrepancy between the information decoded from the second form to the first form and the input information in the first form, and interrupting the recording of information in response to detection of the discrepancy.

From another aspect thereof, the subject invention resides in information recording and playback apparatus having recording equipment including first means for converting input information from a first form into a second form preparatory to recording, and playback equipment including second means for converting information from the second form to the first form upon information playback. The invention according to this aspect more specifically resides in the improvement comprising in combination third means for receiving the input information in the first form, fourth means connected between the first and third means for applying the input information to the first means for conversion from the first form to the second form, fifth means connected to the first means for recording the information in the second form, selectively actuable sixth means connected between the first and second means for selectively applying the information in the second form from the first means to the second means for conversion of the information to the first form, seventh means connected to the sixth means for actuating the sixth means during information recording whereby the second means convert the information from the secnd form to the first form during information recording, eighth means connected between the second and third means for detecting a discrepancy between the information converted by the second means from the second form to the first form and the input information in the first form, and ninth means connected to the eighth means for performing a predetermined function in response to detection of the discrepancy.

From another aspect thereof, the subject invention resides in data recording and playback apparatus having recording equipment including first means for converting input data coded in a first code to data coded in a second code preparatory to recording, and playback equipment including second means for converting data coded in the second code to data coded in the first code upon data playback. The invention according to the latter aspect resides more specifically in the improvement comprising in combination third means for receiving the input data in the first code, fourth means connected between the first and third means for applying the input data to the first means for conversion from the first code to the second code, fifth means connected to the first means for recording the data in the second code, selectively actuable sixth means connected between the first and second means for selectively applying the data in said second code from the first means to the second means for conversion of the data to the first code, seventh means connected to the sixth means for actuating the sixth means during data recording whereby the second means convert the data from the second code to the first code during data recording, eighth means connected between the second and third means for detecting a discrepancy between the data converted by the second means from the second code to the first code and the input data in the first code, and ninth means connected to the eighth means for performing a predetermined function in response to detection of the discrepancy.

BRIEF DESCRIPTION OF THE DRAWINGS

The invention and its objects will become readily apparent from the following detailed description of preferred embodiments thereof, illustrated by way of example in the accompanying drawings, in which.

DESCRIPTION OF PREFERRED EMBODIMENTS

Figure 1:
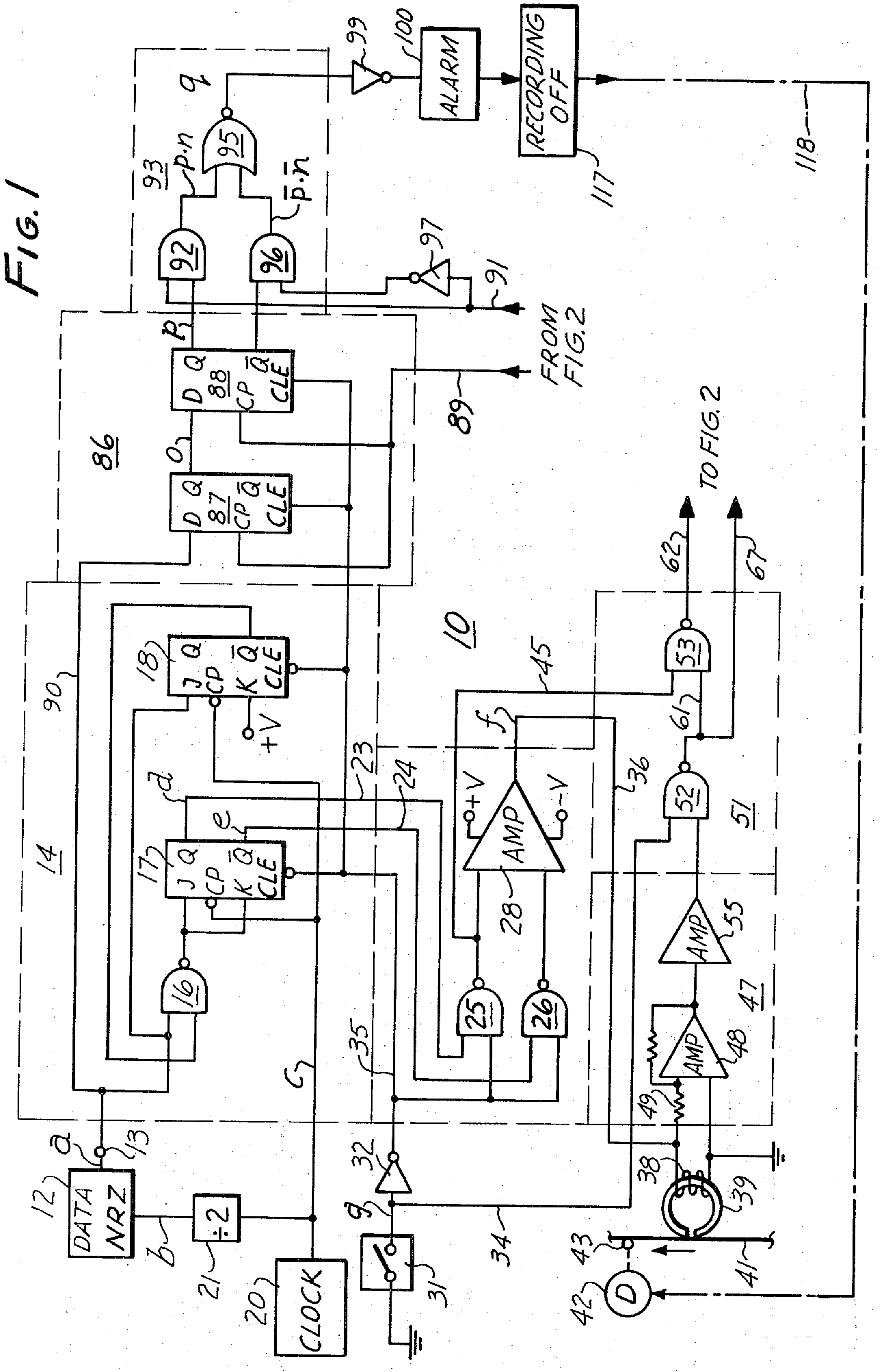
FIGS. 1 and 2 jointly constitute a diagram of an information recording and playback apparatus operated and constituted in accordance with a preferred embodiment of the subject invention.

By way of example and not by way of limitation, the recording apparatus 10 of FIG. 1 has been specifically designed to operate with input data in a so-called "non-return to zero" code. This type of code is sometimes referred to as NRZ-level or NRZ change. In this code, "one" is represented by one level, "zero" is represented by the other level, and a return to zero level does not take place unless the data changes between "one" and "zero." An example of data in an NRZ code is shown in FIG. 3*a*.

Figures 3A, 3B, 3C, 3D, 3E, 3F, 3G, 3H, 3I, 3J, 3K, 3L, 3M, 3N, 3O, 3P, 3Q:
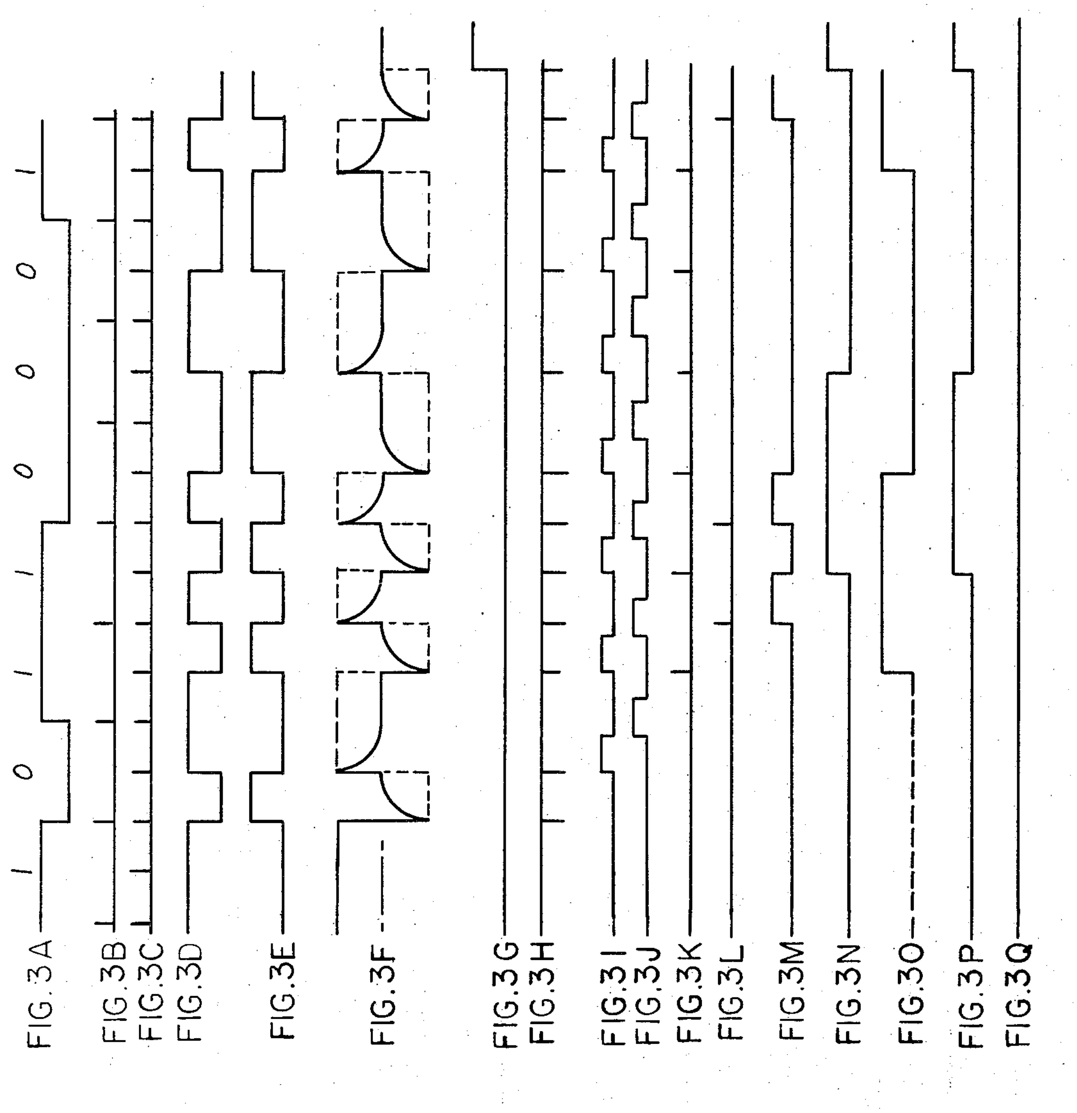
FIG. 3 consisting of FIGS. 3*a* through 3*q* presents a family of curves illustrating the operation of the apparatus of FIGS. 1 and 2.

According to FIG. 3*a*, "one" is represented by the upper level, "zero" is represented by the lower level, and switching from one level to the other level does not take place unless the information changes between "one" and "zero."

FIG. 1 symbolically shows a source 12 of NRZ-coded data. Data sources of this type are conventional and occur, for instance, in computers and data storage equipment.

Figure 2:
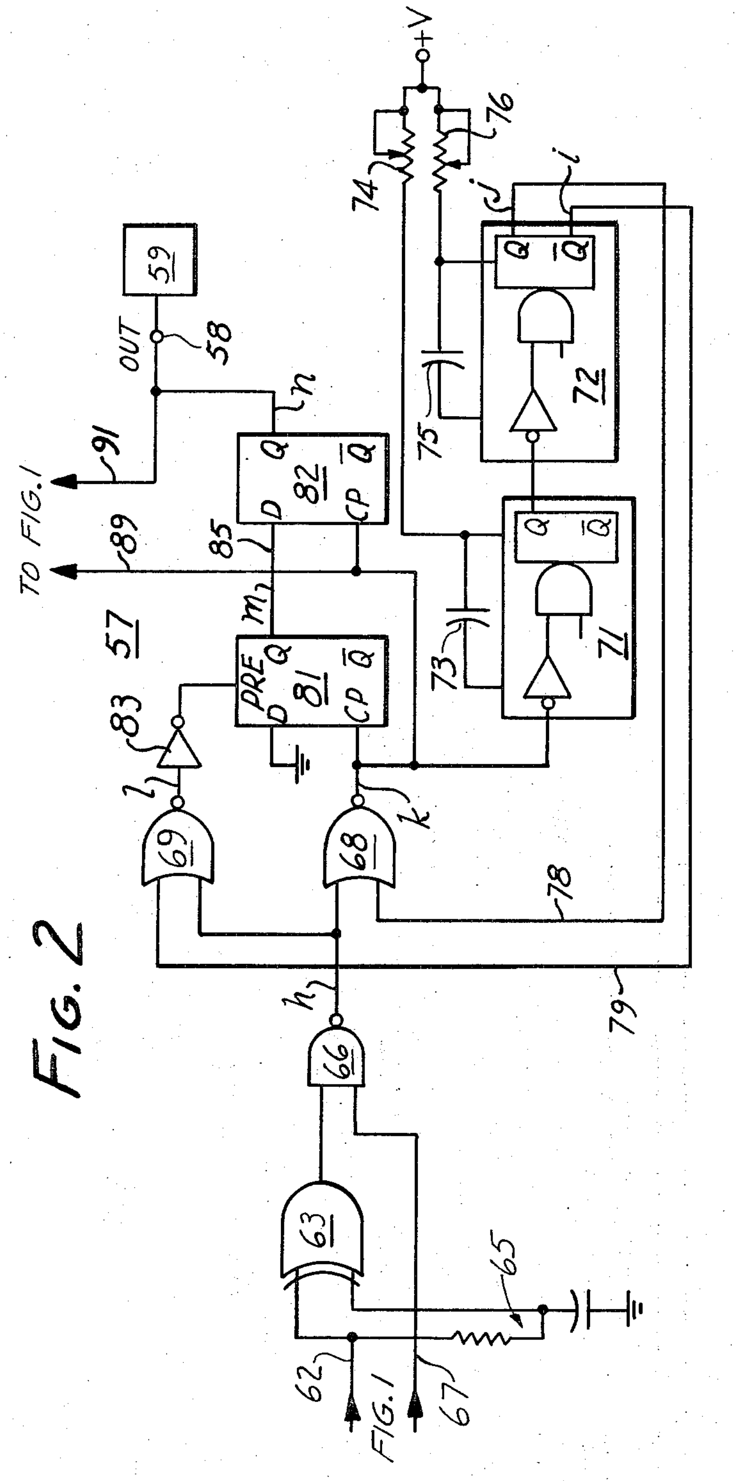

To aid the understanding of FIGS. 1 and 2, the letters which accompany the waveforms of FIG. 3 are used in FIGS. 1 and 2 to designate points at which signals having these waveforms exist. Accordingly, it is seen in FIG. 1 that the NRZ-coded data from the source 12 are applied by way of an input terminal 13 as input data to an encoder 14 of the data recorder 10. The necessity of the encoder 14 may be seen from FIG. 3*a*. The sparsity of zero crossings in the NRZ-coded data of FIG. 3*a* renders the data unsuitable for magnetic recording in the NRZ-coded form. Accordingly, the encoder 14 converts the data from the NRZ-coded form of FIG. 3*a* to the bi-phase coded form of FIGS. 3*d* and *e*.

To this end, the encoder 14 comprises a NAND-gate 16 and two J-K flip-flops 17 and 18. The NAND-gate 16 is a conventional logic element which performs an inverted AND function of the type $\overline{A \cdot B}$. The J-K flip-flops 18 and 19 are conventional logic elements which are commercially available under that designation.

The data input 13 is connected to one input of the NAND-gate 16 and to the J-input of the J-K flip-flop 18. The second input of the NAND-gate 16 is connected to the $\overline{Q}$-output of the J-K flip-flop 18.

Operation of the data source 12 and of the J-K flip-flops 17 and 18 is controlled by a clock 20. The clock 20 is a conventional design that generates pulses of the type shown in FIG. 3*c*. These pulses are applied to the CP inputs of the J-K flip-flops 17 and 18 to control their operation in a conventional manner. The clock pulses shown in FIG. 3*c* are also applied to a factor-of-two divider 21 that produces pulses of the type shown in FIG. 3*b*. These pulses have only half the frequency of the pulses generated by the clock 20. The pulses of FIG. 3*b* are applied to the data source 12 to control the shifting of data to the input 13 in a conventional manner.

The data encoded by the encoder 14 appear at the Q and $\overline{Q}$ outputs of the J-K flip-flop 17 and are shown in FIG. 3 by the waveforms d and e, respectively. The data represented by the waveforms of FIGS. 3*d* and 3*e* are of a bi-phase coded type. Leads 23 and 24 apply the bi-phase coded data to the first inputs of two NAND-gates 25 and 26. The NAND-gates 25 and 26 are combined with a level switching and write amplifier stage 28.

The apparatus shown in FIG. 1 has a switch 31 which is open in the read mode and which is closed for the write mode. In the closed position, the switch 31 connects the input of an inverter 32 to ground. Accordingly, a lead 34 connected to the input of the inverter 32 carries a high potential when the switch 31 is open for the read mode and a low potential when the switch 31 is closed for the write mode. In consequence, the line 35 connected to the output of the inverter 32 carries a low potential when the switch 31 is open for the read mode and a high potential when the switch 31 is closed for the write mode.

When switch 31 is open, the J-K flip-flops 17 and 18 are cleared by the application of the low potential through the lead 35 to the clearing inputs CLE of these flip-flops.

Since the second inputs of the NAND-gates 25 and 26 are connected to the lead 35, these NAND-gates act as inverters in the write mode.

The level change switch or amplifier 28 is connected to positive and negative terminals as shown and switches levels between the applied positive and negative voltages in response to the input potentials applied by the NAND-gates 25 and 26. The resulting waveform appearing at the output of the level change switch or amplifier 28 is shown in FIG. 3*f*. A lead 36 applies the output signal of the switch or ampli-fier 28 to the winding 38 of a magnetic recording head 39. The recording head differentiates the applied signals as indicated by the exponential decay curves in FIG. 3*f*. The resulting changes in magnetization at the airgap of the recording head 39 are recorded on a magnetic recording tape 41 which is advanced past the recording head gap by a tape drive 42 that acts on the tape by way of a capstan 43. The data are thus magnetically recorded in a bi-phase coded form.

In practice, errors in the encoding process frequently have drastic consequences if they go undetected. In principle, it would be possible to replay the recorded signals from the tape immediately after recording and to check these signals against the input data. While such a replay of data for checking purposes is within the contemplation of the subject invention, the preferred embodiment of FIG. 1 picks up the signals in the write mode ahead of the recording process. By way of example, a lead 45 picks up the encoded signals from the output of the NAND-gate 25. This is a preferred simplified solution in cases where the probability of a malfunction in the switch or amplifier 28 and in the recording process itself is negligible.

It should be recognized at this juncture that the read amplifier 47 is not available for data processing purposes in the write mode. Rather, the read amplifier stage 48 receives current through a resistor 49 which blocks the read amplifier during data recording Accordingly, the lead 45 applies the encoded data to a switching device 51 especially provided in accordance with a preferred embodiment of the subject invention.

The switching device 51 has NAND-gates 52 and 53. The NAND-gate 52 has a first input connected to the lead 34 and a second input connected to the output of the amplifier stage 55 of the read amplifier 47.

The NAND-gate 52 has a hysteresis which makes it operate as a Schmidt trigger. In the read mode, the lead 34 applies a high potential to the first input of the NAND-gate 52 so that the same acts like an inverter for the data played back by the head 39 and amplified by the reading amplifier stages 48 and 55 of the read amplifier 47. In the read mode, the lead 45 applies a high potential to the NAND-gate 53 so that the same acts as an inverter for the data played back from the tape 41.

In the read mode, the played-back data are applied to the decoder 57 shown in FIG. 2 for their conversion from the bi-phase code to the NRZ code. The played back converted NRZ-coded data appear at the output 58 and may be applied to data storage, computing and/or display equipment 59. It is thus seen that the decoder 57 is part of the playback equipment of the recording and playback apparatus shown in FIGS. 1 and 2.

In the write mode, the read or playback amplifier 47 is blocked by saturation, and the potential of the lead 34 is low as mentioned above. Accordingly, the potential of the lead 61 connected between the output of the NAND-gate 52 and the second input of the NAND-gate 53 is high In this high. the NAND-gate 53 acts as an inverter for the data derived from the output of the NAND-gate 25 by the lead 45. A lead 62 extending from the apparatus of FIG. 1 to the circuits of FIG. 2 applies the inverted data to a first input of an exclusive OR-element 63. One input of the exclusive OR-element 63 is delayed relative to the other input by a R/C network 65 to make the output of the element 63 go high for each level change of the played-back data.

The output of the element 63 is connected to a first input of a NAND-gate 66. A lead 67 which extends from the apparatus of FIG. 1 to the circuitry of FIG. 2 connects the output of the NAND-gate 52 to a second input of the NAND-gate 66. The lead 67 thus applies a high potential to the second input of the NAND-gate 66 in the write mode. Accordingly, the NAND-gate 66 acts as an inverter for the output signals of the element 63 in the write mode. FIG. 3*h* shows the resulting pulses at the output of the NAND-gate 66. It will be noted that there is a pulse for each zero crossing of the waveform shown in FIG. 3*f*.

The pulses from the output of the gate 66 are applied to first inputs of two NOR-elements 68 and 69. These NOR-elements are gated through second inputs by the pulses shown in FIGS. 3*a* and *j*. These pulses are produced by one-shot multivibrators 71 and 72. The multivibrator 71 has a timing capacitor 73 and is connected to a variable resistor 74 which permits adjustment of the width of the pulses shown in FIG. 3*i*. This type of adjustment is commonly referred to as delay adjustment. The multivibrator 72 has a timing capacitor 75 and is connected to a variable resistor 76 which permits an adjustment of the width of the pulses shown in FIG. 3*j*. This type of adjustment is frequently referred to as window adjustment, the idea being that the pulses produced by the multivibrator 72 provide "windows" through which pulses to be gated can pass.

A lead 78 connects the Q-output of the multivibrator 72 to the second input of the NOR-gate 68 for gating pulses shown in FIG. 3*h* by the pulses shown in FIG. 3*j*. The gated pulses occurring at the output of the NOR-element 68 are shown in FIG. 3*k*.

A lead 79 connects the $\overline{Q}$-output of the multivibrator 72 to the second input of the NOR-element 69 for a gating of pulses shown in FIG. 3*h* by the delay pulses shown in FIG. 3*i*. The gated pulses occurring at the output of the NOR-element 69 are shown in FIG. 3*b*.

The output pulses of the NOR-element 68 shown in FIG. 3*k* constitute gated output data that are applied to the clock pulse inputs of dual delay flip-flop elements 81 and 82, and that are also applied to the input of the first multi-vibrator 71 mentioned above.

An inverter 83 applies the output pulses of the NOR-element 69 shown in FIG. 3 *l* to the presetting input PRE of the delay flip-flop 81. The signals generated at the Q-output of the flip-flop 81 are represented in FIG. 3*m*, showing the generation of a pulse for each pulse of the waveform of FIG. 3 *l*. A lead 85 connects the Q-output of the delay flip-flop 81 to the delay or D input of the flip-flop 82. The pulses occurring at the Q-output of the flip-flop 82 are shown in FIG. 3*n*, and are generated by the shifting of the data shown in FIG. 3*m* into the flip-flop 82 under the control of the gated output data clock shown in FIG. 3*k*. It will be recognized that the data occurring in the read or write mode at the output terminal 58 shown in FIG. 2 are delayed relative to the data applied to the input 13 shown in FIG. 1. According to a preferred embodiment of the subject invention, the input data are synchronized with the decoded or converted data processed by the decoder 57 prior to a comparison of, and detection of discrepancy between these two types of data.

In accordance with the illustrated preferred embodiment, this is accomplished by delaying the input data into synchronism with the decoded or converted data by means of delay equipment 86. This equipment comprises dual delay flip-flop elements 87 and 88, each having a data input D, a clearing input CLE, a clock pulse input CP, a Q-output and a $\overline{Q}$-output.

A lead 90 applies the input data from the terminal 13 to the D-iput of the flip-flop 87. A lead 89 extends from the circuitry of FIG. 2 to the apparatus of FIG. 1 and connects the output of the NOR-element 68 to the CP inputs of the delay flip-flops 87 and 88. In this manner, the input data from the terminal 13 are shifted into the flip-flops 87 and 88 under the control of the gated output data clock shown in FIG. 3*k*. The flip-flops 87 and 88 are preset by the low potential applied by the lead 35 through the CLE inputs in the read mode.

The data generated at the Q-output of the flip-flop element 87 are shown in FIG. 3 *o* and are applied to the D-input of the flip-flop element 88. The data generated at the Q-output of the flip-flop element 88 are shown in FIG. 3*p*. These data are the input data received through the terminal 13 after synchronization with the data occurring at the out-put terminal 58 of the decoder 57. It will be noted that the dual delay flip-flop elements 87 and 88 in the delay equipment 86 correspond to the dual delay flip-flop elements 81 and 82 in the decoder 57 and are clocked by the same pulses in synchronism.

A lead 91 extending from the circuitry in FIG. 2 to the apparatus in FIG. 1 connects the Q-output of the flip-flop 82 or the output terminal 58 shown in FIG. 2 to a first input of an AND-element 92 in a difference gate 93. In this manner, the output signals of the decoder 57 shown in FIGS. 2 and 3*n* gate the synchronized input data shown in FIG. 3*p*. The output $p \cdot n$ of the AND elment 92 is applied to a first input of a NOR-element 95.

The $\bar{Q}$-output of the flip-flop 88 is connected to a first input of an AND element 96, and the lead 91 is connected through an inverter 97 to a second input of the AND element 96. In this manner, the inverted output data of the flip-flop 88 are gated by the inverted version of the output of the decoder 57. The resulting signals $\bar{p} \cdot \bar{n}$ are applied to a second input of the NOR-element 95.

The signal occurring at the output of the NOR-element 95 is shown in FIG. 3*q*. This signal remains at the same level as long as there is no discrepancy between the synchronized input data and decoded or converted output data. The output of the NOR-element 95 is connected by an inverter 99 to an alarm 100. The alarm 100 is of a conventional type which produces a signal (e.g., flashing light, sound and/or electrical error signal) in response to the detection of a discrepancy between the synchronized input data and the decoded or converted output data. Since the output signal of the NOR-element 95 remains at the level shown in FIG. 3*q* as long as there is no such discrepancy, the alarm 100 is not activated in the absence of such discrepancy. The recording process thus proceeds in a normal fashion.

An example of a malfunction will now be described with the aid of FIG. 4 which is identical to FIG. 3, except for the waveforms that are affected by the malfunction.

Figures 4A, 4B, 4C, 4D, 4E, 4F, 4G, 4H, 4I, 4J, 4K, 4L, 4M, 4N, 4O, 4P, 4Q:
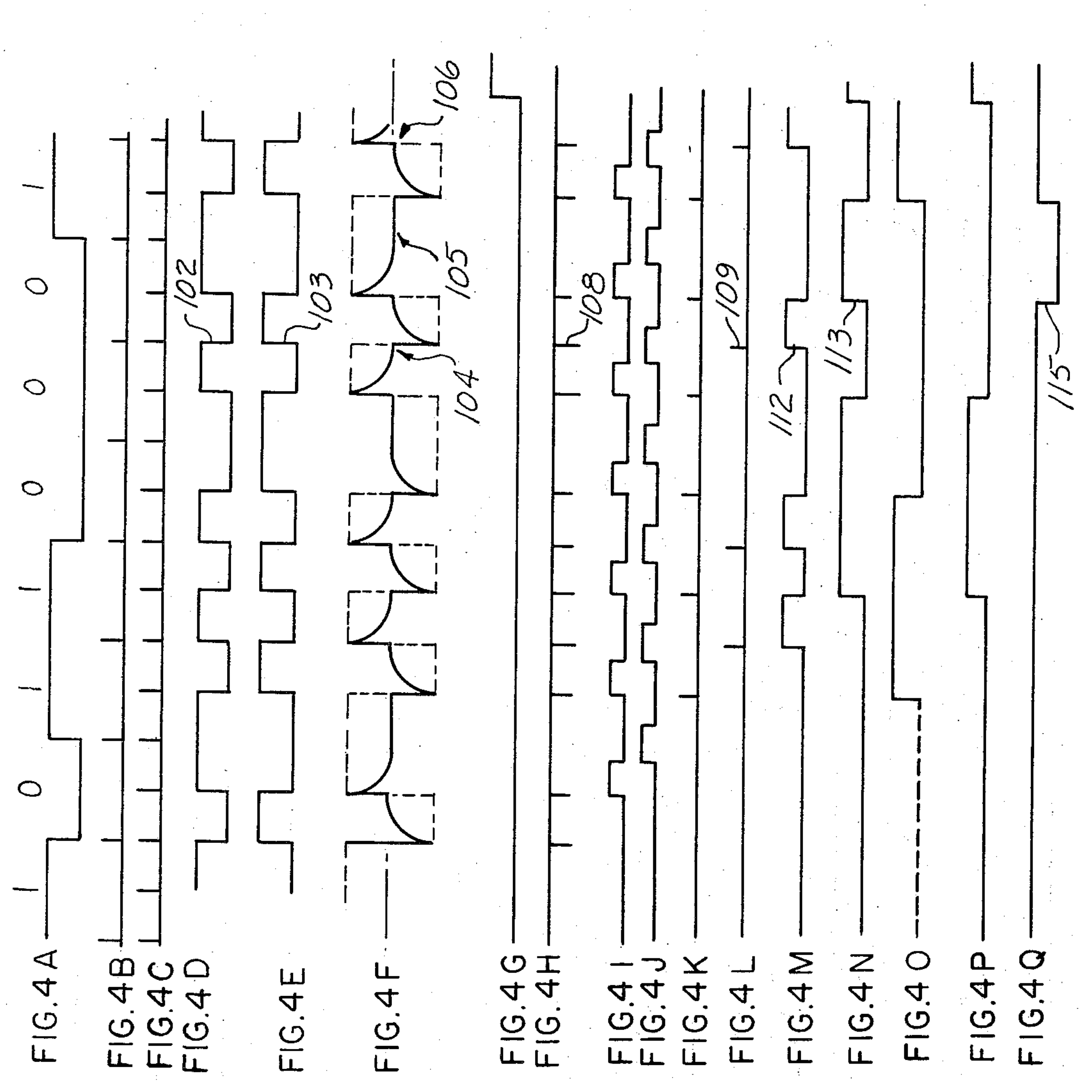
FIG. 4 consisting of FIGS. 3*a* through 3*q* presents a family of curves illustrating the occurrence of an error in the operation of the apparatus of FIGS. 1 and 2.

As an illustrative case, it is assumed that the malfunction occurs in the form of a spurious switching transition in the J-K flip-flop 17 of the encoder 14. The effect of this spurious transition is shown at 102 and 103 in FIGS. 4*d* and 4*e*. As shown in FIG. 4*f* at 104, 105 and 106, the spurious transition results in the recording of erroneous data.

According to the subject invention, this error is immediately detected by the use of the playback decoder 57 during the recording process. Due to the presence and operation of the switching device 51 in the illustrated embodiment of the subject invention, the erroneous switching transition of the flip-flop 17 is signified in the waveform of FIG. 4*h* by an extra pulse 108. This, in turn, provides an extra pulse 109 in the waveform shown in FIG. 4 l.

In consequence, extra pulses 112 and 113 appear in the waveforms shown in FIGS. 4*m* and *n*. A comparison of the decoded data of FIG. 4*n* with the delayed or synchronized input data of FIG. 4*p* by the difference gate 93 accordingly yields an error signal in the form of a negative-going pulse 115 or break in the high level of the signal shown in FIG. 4*q*.

The pulse 115 is applied to the alarm 100 by way of the inverter 99 and activates this alarm to indicate the occurrence of an error in the encoder 14. This alerts the operator to take appropriate measures.

If desired, a conventional switching device 117 may be provided for switching off the recording process in response to an alarm condition, as indicated by the phantom line 118. Numerous electronic switching devices and circuits are known for switching off an operation in response to a pulse.

Those skilled in the art will recognize that the principles of the subject invention are not restricted to the detection of errors caused by data encoders. Rather, the subject invention is generally applicable to apparatus which convert information from a first form to a second form during recording and which include playback equipment capable of converting information from the second form back to the first form.

This, by way of example, makes the subject invention also applicable to data recording systems (instrumentation recording, video recording, etc.) in which input information is time modulated preparatory to recording and is demodulated upon playback. In these instances, the playback demodulating equipment is employed according to the subject invention to demodulate the time-modulated information during the recording process. The demodulated information is continuously compared with the input information to detect errors in the modulation process.

Other variations or modifications within the spirit and scope of the subject invention will become apparent or suggest themselves to those skilled in the art.

I claim:

1. In information recording and playback apparatus having recording equipment including first means for converting input information from a first form into a second form preparatory to recording, and playback equipment including second means for converting information from said second form to said first form upon information playback, the improvement comprising in combination:

third means for receiving said input information in said first form;

fourth means connected between said first and third means for applying said input information to said first means for conversion from said first form to said second form;

fifth means connected to said first means for recording said information in said second form;

selectively actuable sixth means connected between said first and second means for selectively applying said information in said second form from said first means to said second means for conversion of said information to said first form;

seventh means connected to said sixth means for actuating said sixth means during said information recording whereby said second means convert said information from said second form to said first form during information recording;

eighth means connected between said second and third means for detecting a discrepancy between said information converted by said second means from said second form to said first form and said input information in said first form; and ninth means connected to said eighth means for performing a predetermined function in response to detection of said discrepancy.

2. Apparatus as claimed in claim 1, wherein:

said ninth means include means for indicating a detection of said discrepancy.

3. Apparatus as claimed in claim 1, wherein:

said ninth means include means for interrupting said information recording by said fifth means in response to a detection of said discrepancy.

4. Apparatus as claimed in claim 1, wherein:

said eighth means include means for synchronizing said input information in said first form with said information converted by said second means from said second form to said first form, and means for comparing said information converted by said second means from said second form to said first form and said synchronized input information in said first form.

5. In data recording and playback apparatus having recording equipment including first means for converting input data coded in a first code to data coded in a second code preparatory to recording, and playback equipment including second means for converting data coded in said second code to data coded in said first code upon data playback, the improvement comprising in combination:

third means for receiving said input data in said first code;

fourth means connected between said first and thrid means for applying said input data to said first means for conversion from said first code to said second code;

fifth means connected to said first means for recording said data in said second code;

selectively actuable sixth means connected between said first and second means for selectively applying said data in said second code from said first means to said second means for conversion of said data to said first code:

seventh means connected to said sixth means for actuating said sixth means during said data recording whereby said second means convert said data from said second code to said first code during data recording;

eighth means connected between said second and third means for detecting a discrepancy between said data converted by said second means from said second code to said first code and said input data in said first code; and ninth means connected to said eighth means for performing a predetermined function in response to detection of said discrepancy.

6. Apparatus as claimed in claim 5, wherein:

said ninth means include means for indicating a detection of said discrepancy.

7. Apparatus as claimed in claim 5, wherein:

said ninth means include means for interrupting said information recording by said fifth means in response to a detection of said discrepancy.

8. Apparatus as claimed in claim 5, wherein:

said eighth means include means for synchronizing said input data in said first code with said data converted by said second means from said second code to said first code, and means for comparing said data converted by said second means from said second code to said first code and said synchronized input information in said first code.

9. Apparatus as claimed in claim 5, wherein:

said third means include means for receiving NRZ-coded input data;

said fourth means include means connected between said first and third means for applying said NRZ-coded input data to said first means;

said first means include means connected to said fourth means for converting said input NRZ-coded input data to corresponding bi-phase-coded data;

said fifth means include means connected to said means included in said first means for recording said bi-phase-coded data;

said sixth means include selectively actuable means for selectively applying said bi-phase-coded data from said means included in said first means to said second means;

said second means include means connected to said selectively actuable means in said sixth means for converting said bi-phase-coded data to corresponding NRZ-coded data;

said seventh means include means connected to said selectively actuable means included in said sixth means for actuating said selectively actuable means included in said sixth means during said bi-phase-coded data recording whereby said means included in said second means convert said bi-phase-coded data to said corresponding NRZ-coded data during said data recording;

said eighth means include means connected between said means included in said second means and said means included in said third means for detecting a discrepancy between said NRZ-coded data converted by said means included in said second means and said NRZ-coded input data; and said ninth means include means connected to said means included in said eighth means for performing a predetermined function in response to detection of said discrepancy between said NRZ-coded converted data and said NRZ-coded input data.

10. Apparatus as claimed in claim 9, wherein:

said eighth means include means for synchronizing said NRZ-coded input data with said NRZ-coded converted data, and means for comparing said NRZ-coded converted data with said NRZ-coded input data.

11. Apparatus as claimed in claim 10, wherein:

said synchronizing means include means for delaying said NRZ-coded input data into synchronism with said NRZ-coded converted data.

* * * * *